(12) United States Patent
Wakabayashi

(10) Patent No.: US 7,352,709 B2
(45) Date of Patent: Apr. 1, 2008

(54) COMMUNICATION TERMINAL AND COMMUNICATION SYSTEM

(75) Inventor: Hideji Wakabayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/566,968

(22) PCT Filed: Aug. 8, 2003

(86) PCT No.: PCT/JP03/10104

§ 371 (c)(1),
(2), (4) Date: Feb. 2, 2006

(87) PCT Pub. No.: WO2005/015940

PCT Pub. Date: Feb. 17, 2005

(65) Prior Publication Data

US 2006/0176866 A1    Aug. 10, 2006

(51) Int. Cl.
*H04B 7/005* (2006.01)
*H04B 1/44* (2006.01)

(52) U.S. Cl. ............... 370/278; 370/282; 455/452.1

(58) Field of Classification Search ............ 370/310, 370/335, 317, 318, 342, 278, 282; 455/512, 455/88, 517, 452.1, 450, 452.2
See application file for complete search history.

(56) References Cited

U.S. PATENT DOCUMENTS

| | | | |
|---|---|---|---|
| 4,995,056 A * | 2/1991 | Fogg et al. ............ | 375/220 |
| 6,490,271 B1 * | 12/2002 | Erjanne .............. | 370/347 |
| 6,507,572 B1 * | 1/2003 | Kumar et al. ........... | 370/335 |
| 7,003,302 B2 * | 2/2006 | Yoshida et al. .......... | 455/450 |
| 7,079,856 B2 * | 7/2006 | Khan .................. | 455/517 |
| 7,082,108 B2 * | 7/2006 | Hwang et al. .......... | 370/311 |

(Continued)

FOREIGN PATENT DOCUMENTS

JP    2002-9741    1/2002

(Continued)

OTHER PUBLICATIONS

"UE behavior when UE reaches maximum transmission power with HS-DPCCH", Panasonic, 3GPP TSG-RAN WG1 Meeting #32, Paris, May 19-23, 2003, R1-030535.

(Continued)

*Primary Examiner*—Sonny Trinh
(74) *Attorney, Agent, or Firm*—Oblon, Spivak, McClelland, Maier & Neustadt, P.C.

(57) ABSTRACT

A communication system including a base station and a communication terminal transmitting/receiving data to/from this base station, in which the base station transmits downlink packet data to the communication terminal and receives an information signal related to the downlink packet data from the communication terminal that has received the downlink packet data, and the communication terminal includes an overflow estimation mechanism estimating a simultaneous transmission of uplink data and the information signal to the base station and a transmission signal control controlling transmission of the information signal in response to the result of estimation of this overflow estimation mechanism. The communication system is capable of selectively improving communication quality of either uplink communication or downlink communication by avoiding an overflow caused in a power amplification part of the communication terminal.

26 Claims, 13 Drawing Sheets

U.S. PATENT DOCUMENTS

| | | | |
|---|---|---|---|
| 2001/0019956 A1* | 9/2001 | Tada | 455/434 |
| 2002/0082034 A1* | 6/2002 | Suzuki | 455/517 |
| 2002/0167926 A1* | 11/2002 | Lee | 370/338 |
| 2003/0103460 A1* | 6/2003 | Kamath et al. | 370/236.2 |
| 2003/0152095 A1* | 8/2003 | Foore et al. | 370/412 |
| 2003/0161280 A1* | 8/2003 | Gruhn et al. | 370/328 |

FOREIGN PATENT DOCUMENTS

| | | |
|---|---|---|
| JP | 2002-521938 | 7/2002 |
| JP | 2002-247048 | 8/2002 |
| JP | 2002-261687 | 9/2002 |
| JP | 2002-281047 | 9/2002 |
| JP | 2003-199173 | 7/2003 |

OTHER PUBLICATIONS

"Physical layer structure—relationship to existing transport channels", Nokia, 3GPP TSG-RAN Meeting #31, Tokyo, Feb. 18-21, 2003.

* cited by examiner

F I G. 6
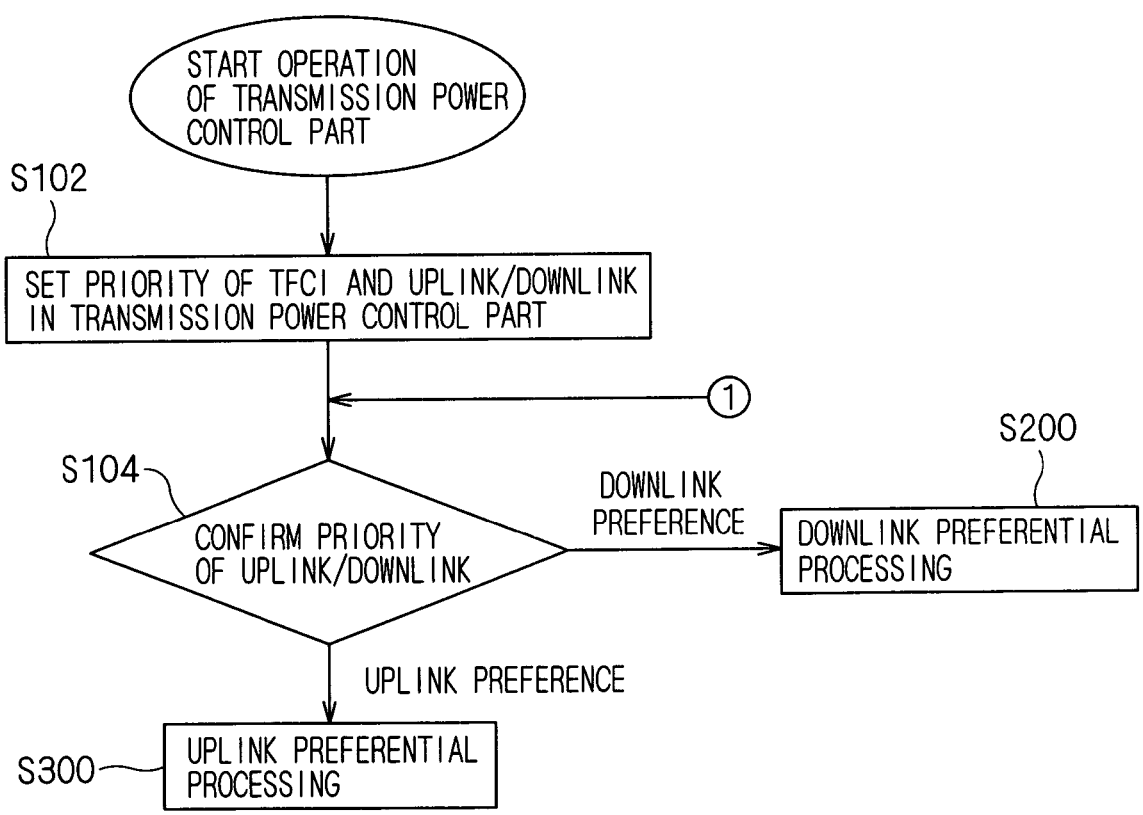

FIG. 9

| TFC INDICATOR | EUDTCH | DCCH | |
|---|---|---|---|
| #1 | 0 BY 336 BITS | 0 BY 148 BITS | TRANSMISSION RATE: LOW |
| #2 | 0 BY 336 BITS | 1 BY 148 BITS | |
| #3 | 1 BY 336 BITS | 0 BY 148 BITS | |
| #4 | 1 BY 336 BITS | 1 BY 148 BITS | |
| #5 | 2 BY 336 BITS | 0 BY 148 BITS | |
| #6 | 2 BY 336 BITS | 1 BY 148 BITS | TRANSMISSION RATE: HIGH |

FIG. 10

CASE. A

| TFC INDICATOR | EUDTCH | DCCH | REPETITION NUMBER |
|---|---|---|---|
| #1 | 1 BY 336 BITS | 0 BY 148 BITS | ONCE |
| #2 | 1 BY 336 BITS | 1 BY 148 BITS | ONCE |
| #3 | 2 BY 336 BITS | 0 BY 148 BITS | ONCE |
| #4 | 2 BY 336 BITS | 1 BY 148 BITS | ONCE |

CASE. B

| TFC INDICATOR | EUDTCH | DCCH | REPETITION NUMBER |
|---|---|---|---|
| #1 | 1 BY 336 BITS | 0 BY 148 BITS | ONCE |
| #2 | 1 BY 336 BITS | 1 BY 148 BITS | TWICE |
| #3 | 2 BY 336 BITS | 0 BY 148 BITS | THREE TIMES |
| #4 | 2 BY 336 BITS | 1 BY 148 BITS | FOUR TIMES |

CASE. C

| TFC INDICATOR | EUDTCH | DCCH | REPETITION NUMBER |
|---|---|---|---|
| #1 | 1 BY 336 BITS | 0 BY 148 BITS | THREE TIMES |
| #2 | 1 BY 336 BITS | 1 BY 148 BITS | FOUR TIMES |
| #3 | 2 BY 336 BITS | 0 BY 148 BITS | TRANSMISSION: OFF |
| #4 | 2 BY 336 BITS | 1 BY 148 BITS | TRANSMISSION: OFF |

CASE. D

| TFC INDICATOR | EUDTCH | DCCH | REPETITION NUMBER |
|---|---|---|---|
| #1 | 1 BY 336 BITS | 0 BY 148 BITS | ONCE |
| #2 | 1 BY 336 BITS | 1 BY 148 BITS | TRANSMISSION: OFF |
| #3 | 2 BY 336 BITS | 0 BY 148 BITS | TWICE |
| #4 | 2 BY 336 BITS | 1 BY 148 BITS | TRANSMISSION: OFF |

FIG. 11

| TFC INDICATOR | PRIORITY: HIGH<br>TrCH1 | PRIORITY: LOW<br>TrCH2 | HS-DPCCH | TOTAL TRANSMISSION RATE | |
|---|---|---|---|---|---|
| #1 | 0 | 0 | 0 | 0 | TRANSMISSION RATE: LOW |
| #2 | 32K | 0 | 0 | 32K | |
| #3 | 0 | 64K | 0 | 64K | |
| #4 | 32K | 64K | 0 | 96K | TRANSMISSION RATE: HIGH |
| #5 | 0 | 0 | 1 | HS-DPCCH | TRANSMISSION RATE: LOW |
| #6 | 32K | 0 | 1 | 32K + HS-DPCCH | |
| #7 | 0 | 64K | 1 | 64K + HS-DPCCH | |
| #8 | 32K | 64K | 1 | 96K + HS-DPCCH | TRANSMISSION RATE: HIGH |

FIG. 12

| TFC INDICATOR | PRIORITY:1 TrCH1 | PRIORITY:2 TrCH2 | PRIORITY:3 HS-DPCCH | TOTAL TRANSMISSION RATE | |
|---|---|---|---|---|---|
| #0 | 0 | 0 | 0 | 0 | TRANSMISSION RATE: LOW |
| #1 | 0 | 0 | 1 | HS-DPCCH | |
| #2 | 32K | 0 | 0 | 32K | |
| #3 | 0 | 32K | 1 | 32K + HS-DPCCH | |
| #4 | 32K | 32K | 0 | 64K | |
| #5 | 0 | 64K | 0 | 64K | |
| #6 | 0 | 64K | 1 | 64K + HS-DPCCH | |
| #7 | 32K | 64K | 0 | 96K | |
| #8 | 32K | 64K | 1 | 96K + HS-DPCCH | |
| #9 | 0 | 128K | 0 | 128K | |
| #10 | 0 | 128K | 1 | 128K + HS-DPCCH | |
| #11 | 32K | 128K | 0 | 160K | |
| #12 | 32K | 128K | 1 | 160K + HS-DPCCH | TRANSMISSION RATE: HIGH |

FIG. 13

| TFC INDICATOR | PRIORITY:1 HS-DPCCH | PRIORITY:2 TrCH2 | PRIORITY:3 TrCH1 | TOTAL TRANSMISSION RATE | |
|---|---|---|---|---|---|
| #0 | 0 | 0 | 0 | 0 | TRANSMISSION RATE: LOW |
| #1 | 1 | 0 | 0 | HS-DPCCH | |
| #2 | 0 | 0 | 32K | 32K | |
| #3 | 1 | 32K | 0 | 32K + HS-DPCCH | |
| #4 | 0 | 32K | 32K | 64K | |
| #5 | 0 | 64K | 0 | 64K | |
| #6 | 1 | 64K | 0 | 64K + HS-DPCCH | |
| #7 | 0 | 64K | 32K | 96K | |
| #8 | 1 | 64K | 32K | 96K + HS-DPCCH | |
| #9 | 0 | 128K | 0 | 128K | |
| #10 | 1 | 128K | 0 | 128K + HS-DPCCH | |
| #11 | 0 | 128K | 32K | 160K | |
| #12 | 1 | 128K | 32K | 160K + HS-DPCCH | TRANSMISSION RATE: HIGH |

COMMUNICATION TERMINAL AND COMMUNICATION SYSTEM

TECHNICAL FIELD

It relates to a communication system improving communication quality.

PRIOR ART

In such a communication system that a communication terminal receiving downlink packet data transmitted from a base station transmits an information signal related to the aforementioned downlink packet data, the transmission timing for the signal related to the downlink packet data received in the terminal and the transmission timing for uplink data may overlap with each other.

In this case, the total of power necessary for transmitting the information signal related to the downlink packet data and power necessary for transmitting the uplink data may exceed the limit output value of a power amplifier of the communication terminal (hereinafter referred to as "an overflow takes place").

If the power amplifier cannot output the power necessary for transmitting the signal, the error rate of the signal arriving at the base station increases. Although the communication terminal transmits the information signal related to the downlink packet data, therefore, it may be impossible for the base station to correctly receive the signal, resulting in speed reduction of downlink packet communication in this case.

On the other hand, the error rate of the uplink data also increases, to result in quality deterioration of uplink communication.

Accordingly, an object of the present invention is to provide a communication system improving communication quality by avoiding an overflow caused by simultaneously transmitting an information signal related to downlink packet data and uplink data when a communication terminal can simultaneously transmit the information signal related to the downlink packet data and the uplink data.

As a communication system capable of selectively improving the quality of downlink communication and uplink communication, a base station measuring the ratio between the quantity of downlink data transmitted to a radio terminal and the quantity of uplink data received from the radio terminal for increasing the speed of uplink communication if the result of this measurement indicates that the quantity of uplink data is larger while increasing the speed of downlink communication when it indicates that the quantity of downlink data is larger is described in Japanese Patent Application Laying-Open Gazette No. 2002-247048, for example.

Even if employing this base station, however, it is not possible to avoid an overflow caused in the communication terminal when simultaneously transmitting the information signal related to the downlink packet data and the uplink data.

Accordingly, another object of the present invention is to provide a communication system capable of selectively improving communication quality of either uplink communication or downlink communication by avoiding an overflow caused in a communication terminal.

DISCLOSURE OF THE INVENTION

The present invention is a communication system consisting of a base station and a communication terminal transmitting/receiving data to/from this base station, in which the aforementioned base station transmits downlink packet data to the aforementioned communication terminal and receives an information signal related to the aforementioned downlink packet data from the aforementioned communication terminal receiving the aforementioned downlink packet data, and the aforementioned communication terminal comprises overflow estimation means estimating a simultaneous transmission of uplink data and the aforementioned information signal to the aforementioned base station and transmission signal control means controlling transmission of the aforementioned information signal in response to the result of estimation of this overflow estimation means.

According to the aforementioned structure, it is possible to improve communication quality preferentially for uplink communication by avoiding an overflow also in a case where an information signal related to downlink packet data and uplink data are simultaneously transmitted.

DESCRIPTION OF THE DRAWINGS

FIG. 6 An operation explanatory diagram of principal parts of the terminal according to the embodiment 1.

FIG. 9 An explanatory diagram of a TFCI according to the embodiment 1.

FIG. 10 An explanatory diagram of the TFCI according to the embodiment 1.

FIG. 11 An explanatory diagram of a TFCI according to an embodiment 3.

FIG. 12 An explanatory diagram of a TFCI according to an embodiment 4.

FIG. 13 An explanatory diagram of a TFCI according to an embodiment 5.

BEST MODES FOR CARRYING OUT THE INVENTION

Embodiment 1

Figure 1:
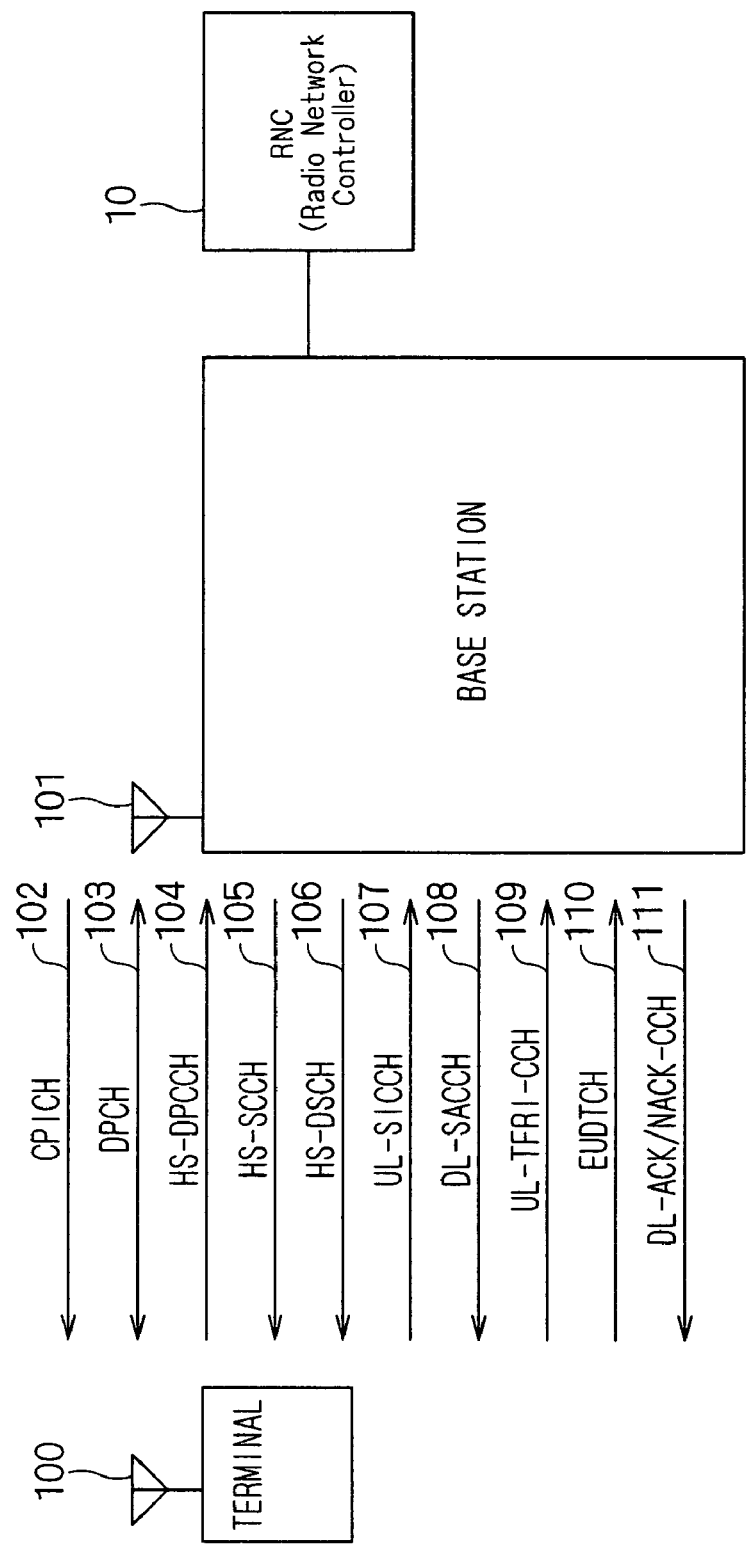
FIG. 1 A block diagram of a communication system according to an embodiment 1.

FIG. 1 is a diagram showing the structure of a packet communication system and a channel structure according to an embodiment 1 of the present invention. Description is now made with reference to the channel structure between a base station 101 and a terminal (communication terminal) 100 of the W-CDMA system. Channel names are tentative names, and may be hereafter changed. As a way of using actual channels, there is such a possibility that a doing of synergistically multiplexing a plurality of control channels on a single channel is also performed. In the W-CDMA system, the terminal 100 may be referred to as UE (User Equipment), and the base station 101 may be referred to as NodeB.

The base station 101 is controlled by an RNC (Radio Network Controller) 10 (SRNC: Serving Radio Network Controller). Information of the terminal 100 is registered in the RNC (Radio Network Controller) 10.

Downlink channels utilized for transmitting data from the base station 101 to the terminal 100 are described. A CPICH 102 (Common Pilot Channel) is utilized for transmitting a pilot signal transmitted in common to all terminals in a cell. This pilot signal acts as a reference for all timing in communication in the cell.

As downlink channels utilized in downlink packet communication, there are an HS-SCCH 105 (HiSpeed Shared Control Channel) utilized for transmitting packet control information and an HS-DSCH 106 (HiSpeed Downlink Shared Channel) utilized for transmitting downlink packet data. These are shared channels utilized in common by the respective terminals in the cell.

As downlink shared channels utilized in uplink packet communication, there exist a DL-SACCH 108 (downlink Scheduling Assignment Control Channel) used for posting an assigned position (transmission time) by a scheduler as that for transmission of control information and a DL-ACK/NACK-CCH 111 (downlink-ACK/NACK Control Channel) for posting success/failure of receiving of uplink packet data in the base station 101.

Uplink channels from the terminal 100 to the base station 101 are now described. As an uplink shared channel utilized in downlink packet communication, there is an HS-DPCCH 104 (HiSpeed Dedicated Physical Control Channel) for control signal transmission. This is employed for transmitting a CQI (Channel Quality Indicator) which is quality information reported to the base station 101 on the basis of a propagation situation of a downlink line and an ACK/NACK which is a signal answering whether or not a downlink packet could be correctly received.

As uplink shared channels utilized in uplink packet communication, there are a UL-SICCH 107 (Uplink Scheduling Information Control Channel) utilized for posting presence/absence of transmission data in the terminal 100, a UL-TFRI-CCH 109 (Uplink TFRI Control Channel) utilized for posting a modulation system, a coding rate and a transmission rate or the like selected by the terminal 100 to the base station 101 and an EUDTCH 110 (Enhanced Uplink Dedicated Transport Channel) utilized for transmitting a data body of an uplink packet.

A DPCH 103 (Dedicated Physical Channel) which is a channel individually set for communication with a specific terminal is set for each of uplink and downlink in an HSDPA communication state, and utilized for communication of a voice, data etc. and signaling of an upper layer.

The structure of a transmission frame of each channel according to the embodiment 1 is described. One frame is constituted of 15 slots, three slots are utilized in single transmission, and these three slots are referred to as subframes. In other words, five subframes are arranged in one frame.

Figure 2:
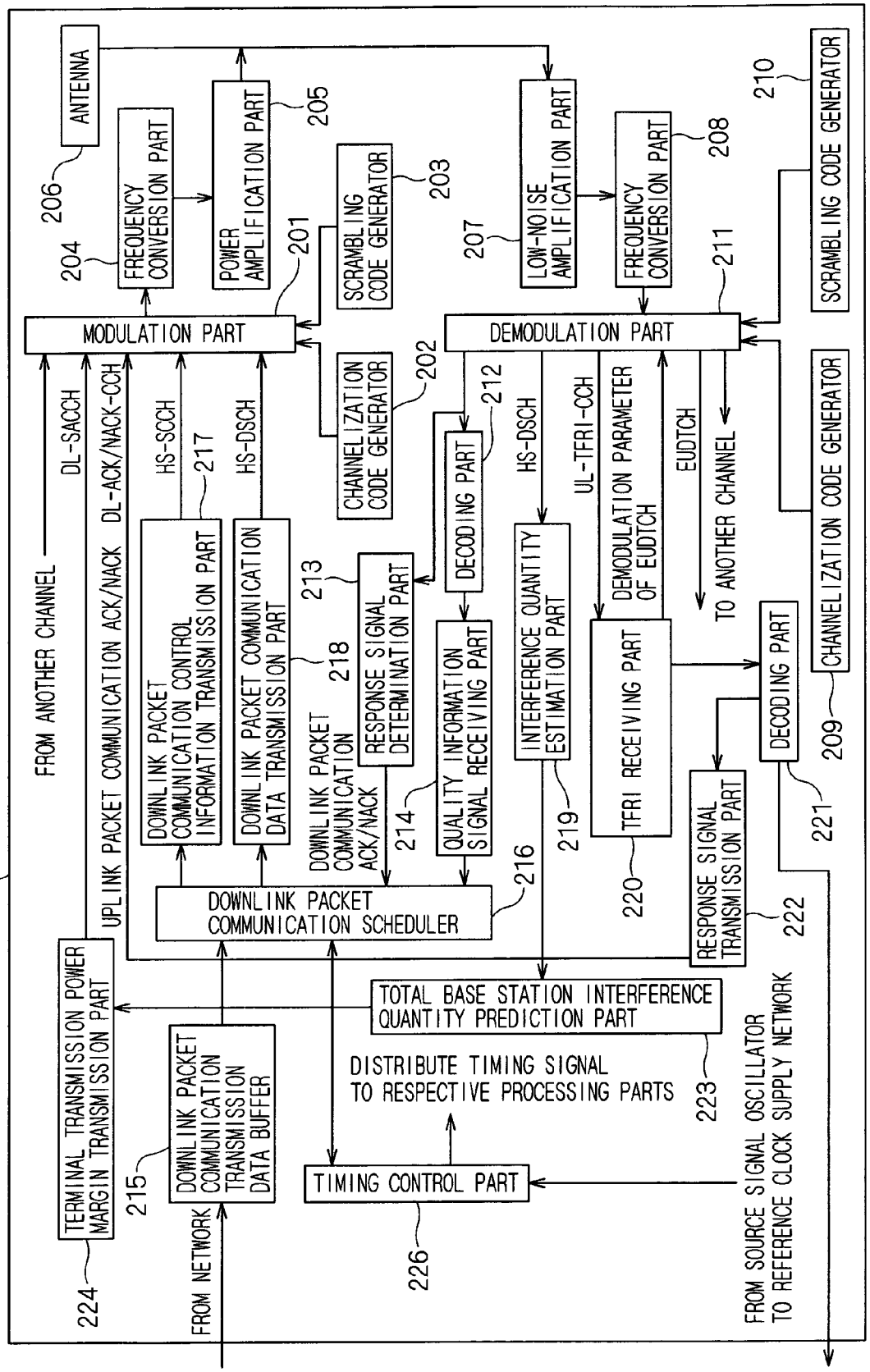
FIG. 2 A block diagram of a base station according to the embodiment 1.

FIG. 2 is a block diagram showing the structure of a base station 200 (101) according to the embodiment 1.

CDMA modulation/demodulation processing is described with reference to FIG. 2. This is a part performing similar processing also in the remaining embodiments, and is a general operation of communication according to the CDMA system.

Description is made from parts related to processing in downlink packet communication to the terminal 100. A modulation part 201 multiplies a signal of each channel by a channelization code generated in a downlink channelization code generator 202, and thereafter multiplexes the signal of each channel. Further, it performs spectrum diffusion processing by multiplying the multiplexed signal by a scrambling code generated in a downlink scrambling code generator 203. A frequency conversion part 204 increases the frequency of a multiplexed baseband signal obtained in this manner to a carrier frequency. Thereafter a power amplification part 205 amplifies the signal to desired power with a power amplifier, and transmits the same through an antenna 206.

In receiving uplink data from the terminal, a weak signal received through the antenna 206 is amplified in a low-noise amplification part 207, and lowered to the frequency of the baseband signal in a frequency conversion part 208. After lowered to the baseband signal, it is input in a demodulation part 211, which in turn performs reverse diffusion processing by multiplying it by a scrambling code generated in an uplink scrambling code generator 210 and separates the same to each channel with a channelization code generated in an uplink channelization code generator 209. Thus, it is possible to separate a code-divided channel.

Processing in downlink packet communication is now described.

Transmission data to each terminal acquired from a network is held in a downlink packet communication data buffer 215. CQI (quality information) transmitted from the terminal by utilizing the HS-DPCCH 104 is decoded by a decoding part 212, and a quality information receiving part 214 acquires the propagation state of the terminal at present therefrom. The data and the quality information are supplied to a downlink packet communication scheduler 216.

The downlink packet communication scheduler 216 acquires scheduling of a downlink communication channel, i.e. a slot assignment situation to each terminal from a timing control part 226, and decides packet transmission timing by totally determining presence/absence of transmission data to each terminal and the propagation state obtained from the quality information. When the packet transmission timing is decided, information necessary when each terminal demodulates downlink data is transmitted by a downlink packet communication control information transmission part 217 through the modulation part 201 by utilizing the HS-SCCH 105. Further, a downlink data body is transmitted by a downlink packet communication data transmission part 218 through the modulation part 201 by utilizing the HS-DSCH 106.

When the transmitted packet is correctly received in the terminal 100, the ACK/NACK is sent from the terminal 100 by utilizing the HS-DPCCH 104 and input in a response signal determination part 213 through the demodulation part 211. The response signal determination part 213 determines the signal, and the determination result is transferred to a downlink packet communication scheduler 216. When determined as the ACK, transmission of a next packet is scheduled while retransmission processing is performed when determined as the NACK. The aforementioned series of flows are repeated in downlink packet communication.

A structure of the base station 200 related to uplink packet communication is described.

The base station 200 needs to post the margin of allowed transmission power to the terminal 100 with respect to a transmission permission request transmitted from the terminal by utilizing the UL-SICCH 107. An interference measuring part 219 measures a current interference quantity also inclusive of an interference quantity in another cell. In consideration of this value and power etc. utilized for another voice channel etc., a base station total interference quantity prediction part 223 predicts a total interference quantity at a point of time when it is transmitted from the terminal 100 by utilizing the EUDTCH 110, and a terminal transmission power margin transmission part 224 transmits the same to each terminal by utilizing the DL-SACCH 108.

In receiving packet data transmitted from the terminal 100 by utilizing the EUDTCH 110, a demodulation parameter necessary for receiving the packet data from the terminal 100 transmitted from the terminal by utilizing the UL-TFRI-CCH 109 is first supplied to a TFRI receiving part 220 through the demodulation part 211. The obtained demodulation parameter is supplied to the demodulation part 211 and a decoding part 221.

The packet data transmitted from the terminal by utilizing the EUDTCH 110 is supplied to the decoding part 221 through the demodulation part 211, subjected to error correction checking, and thereafter supplied to a response signal transmission part 222, so that a response signal of the ACK is generated when there is no receiving error while a response signal of the NACK is generated when an error takes place. The ACK/NACK response signal is transmitted to the terminal by utilizing the DL-ACK/NACK-CCH 111.

The timing control part 226 generates timing for subframes etc. on the basis of a reference clock signal supplied from a source signal oscillator (not shown) and supplies the same to each processing part. These series of flows are repeated in uplink packet communication.

Figure 3:
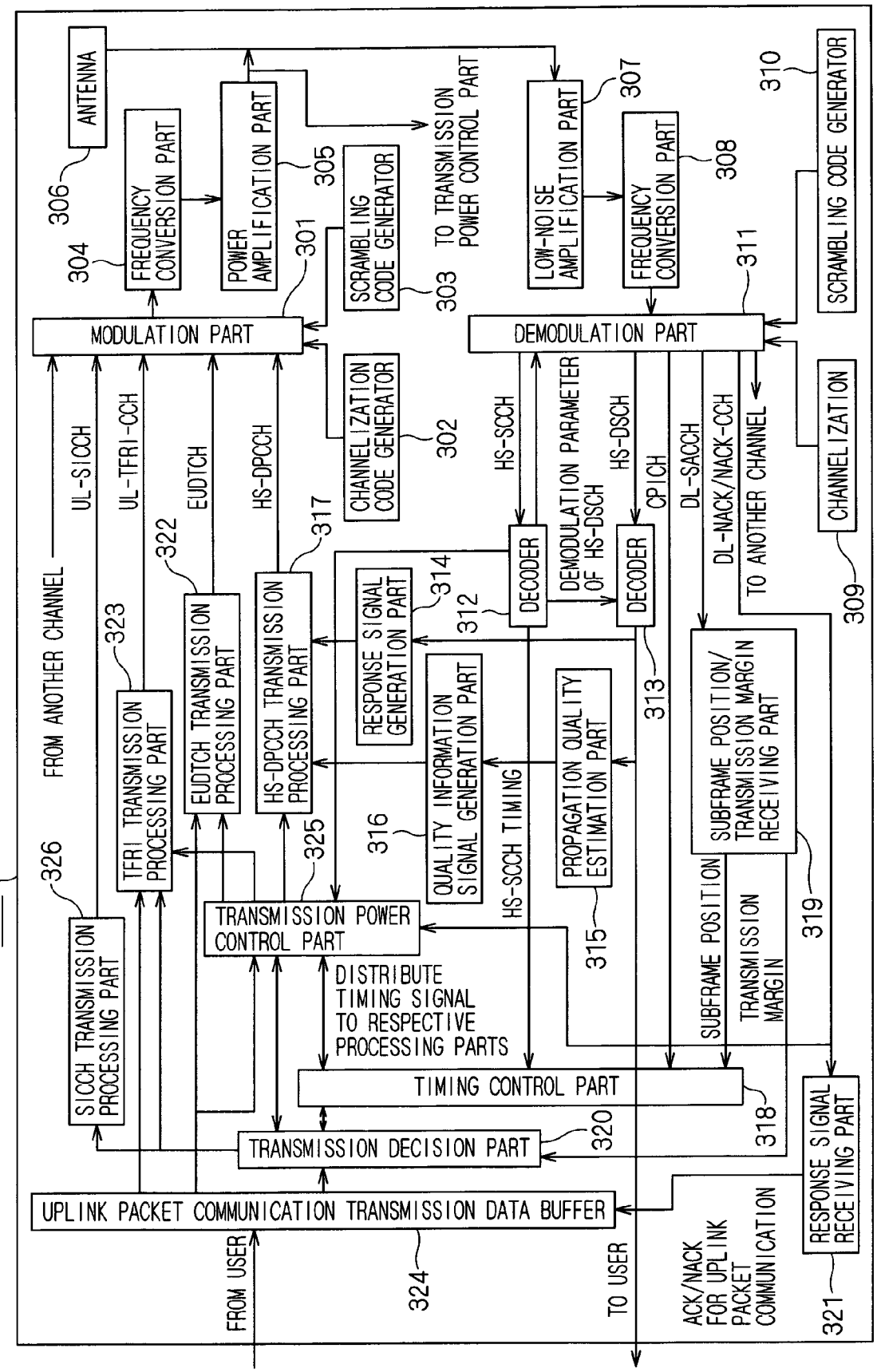
FIG. 3 A block diagram of a terminal according to the embodiment 1.

FIG. 3 is a block diagram showing the structure of the terminal 100 (300) according to the embodiment 1.

CDMA modulation/demodulation processing is first described. This part is a part also similar in the remaining embodiments, and is general processing of a terminal making communication according to the CDMA system.

A modulation part 301 multiplies the signal of each channel by a channelization code generated in a channelization code generator 302 and multiplexes the same later. It performs spectrum diffusion processing by multiplying the multiplexed one by a scrambling code generated in a scrambling code generator 303. A frequency conversion part 304 raises this multiplexed baseband signal to a carrier frequency. Thereafter a power amplification part 305 introduces the signal into a power amplifier, amplifies the same to desired power, and transmits the same through an antenna 306.

In signal receiving from the base station 200, a weak signal received through the antenna 306 is amplified in a low-noise amplification part 307, and lowered to the frequency of the baseband signal in a frequency conversion part 308. This baseband signal is input in a demodulation part 311. The demodulation part 311 performs reverse diffusion processing by multiplying the baseband signal by a scrambling code generated in a scrambling code generator 310, and separates the signal to each channel with a channelization code generated in a channelization code generator 309. Thus, it is possible to separate a code-divided channel.

A structure related to data processing in downlink packet communication is now described. The reference timing posted from the base station 200 by utilizing the CPICH 102 is supplied to a timing control part 318 through the demodulation part 311. The timing control part 318 supplies the timing signal serving as the reference for processing timing to each processing part. In particular, it outputs a transmission timing signal for uplink packet data to an EUDTCH transmission processing part 322 on the basis of schedule information received from the base station 200, and outputs a transmission timing signal for a downlink packet response signal to an HS-DPCCH transmission processing part 317 on the basis of an HS-SCCH timing signal. The transmission timing signal output from the HS-DPCCH transmission processing part 317 is generated on the basis of a reference after a lapse of a previously set time from the transmission timing of the HS-SCCH or the HS-DSCH.

Further, the reference timing is posted also to a propagation quality estimation part 315, and utilized for estimation of propagation states of the downlink channels. A quality information signal generation part 316 generates a CQI value on the basis of the propagation states estimated in the propagation quality estimation part 315, supplied to the HS-DPCCH transmission processing part 317, and transmitted to the base station 200 by utilizing the HS-DPCCH 104.

When the packet data transmitted from the base station 200 is received in a terminal 300, a packet control signal transmitted by utilizing the HS-SCCH 105 is supplied to a decoder 312 through the demodulation part 311, to be subjected to decoding processing. A demodulation parameter for the packet data transmitted from the base station 200 by utilizing the HS-DSCH 106 is obtained by decoding the control signal in the decoder 312. The demodulation parameter is supplied to the demodulation part 311 and a decoder 313. The packet data transmitted from the base station 200 by utilizing the HS-SCCH 105 is supplied to the decoder 313 through the demodulation part 311. An ACK signal is generated in a response signal generation part 314 when the packet can be correctly received, while a NACK signal is generated in a case of an error. The generated ACK/NACK is arranged in a prescribed slot in the HS-DPCCH transmission processing part 317, and posted to the base station 101 by utilizing the HS-DPCCH 104. This serial processing is repeated in downlink packet communication.

A structure of the terminal 300 related to uplink packet communication is now described.

A permitted transmission power margin transmitted from the base station 200 by utilizing the DL-SACCH 108 with respect to transmission permission transmitted from the terminal 300 to the base station 200 by utilizing the UL-SICCH 107 is supplied to a transmission margin receiving part 319 through the demodulation part 311. The transmission margin receiving part 319 posts the maximum power permitted to the terminal to a transmission power control part 325. According to a user's instruction, data to be transmitted through an upper layer is stored in an uplink packet communication transmission data buffer 324. The uplink packet communication transmission data buffer 324 posts the fact that there is the data to be transmitted in the buffer to a transmission decision part 320. The transmission decision part 320 decides a TFCI (Transport Format Combination Indicator) when transmitting a packet, and posts the same to a TFRI transmission processing part 323.

The TFCI is information for posting combination of the type of a transport channel transmitting the data, a transmission rate etc., which is posted from the terminal to the base station before transmission of uplink data. While the TFCI may also be referred to as a TFRI (Transport Format and Resource Indicator), the TFRI is included in the TFCI.

The TFRI transmission processing part 323 performs transmission of the TFCI by utilizing the UL-TFRI-CCH 109 according to a subframe position specified by the timing control part 318. Transmission data stored in the uplink packet communication transmission data buffer 324 is supplied to the EUDTCH transmission processing part 322, and the EUDTCH transmission processing part 322 performs transmission of the data by utilizing the EUDTCH 110 according to the subframe position specified by the timing control part 318.

The base station 200 transmits the ACK/NACK response signal with respect to the packet data transmitted from the terminal 300 by utilizing the EUDTCH 110 to a terminal 300 by utilizing the DL-ACK/NACK-CCH 111. The ACK/NACK signal transmitted by the DL-ACK/NACK-CCH 111 is supplied to a response signal receiving part 321 through the demodulation part 311. The receiving result is posted to the uplink packet communication transmission data buffer 324. The uplink packet communication transmission data buffer 324 performs retransmission when the receiving result is the NACK, while deleting transmitted data and transmitting a next packet in a case of the ACK. These series of flows are repeated in uplink packet communication.

Flows of downlink packet communication are now described. The base station 200 transmits the pilot signal to the terminal 300 present in the cell by utilizing the CPICH 102. Further, the DPCH 103 is set at the time of a communication state. When the base station 200 starts data transmission, it transmits information including a modulation system necessary for demodulating packet data transmitted to the terminal 300 by the HS-DSCH 106, a coding rate etc. by utilizing the HS-SCCH 105. The terminal 300 receives this information, and starts demodulating the packet data transmitted by the HS-DSCH 106 by utilizing the same if the same is destined therefor. It neglects the same if the same is not destined therefor. The terminal 300 performs collation of the demodulated data, and transmits the ACK to the base station 200 by utilizing the HS-DPCCH 104 when it seems that there is no error, while transmitting the NACK when it seems that there is an error.

Figure 4:
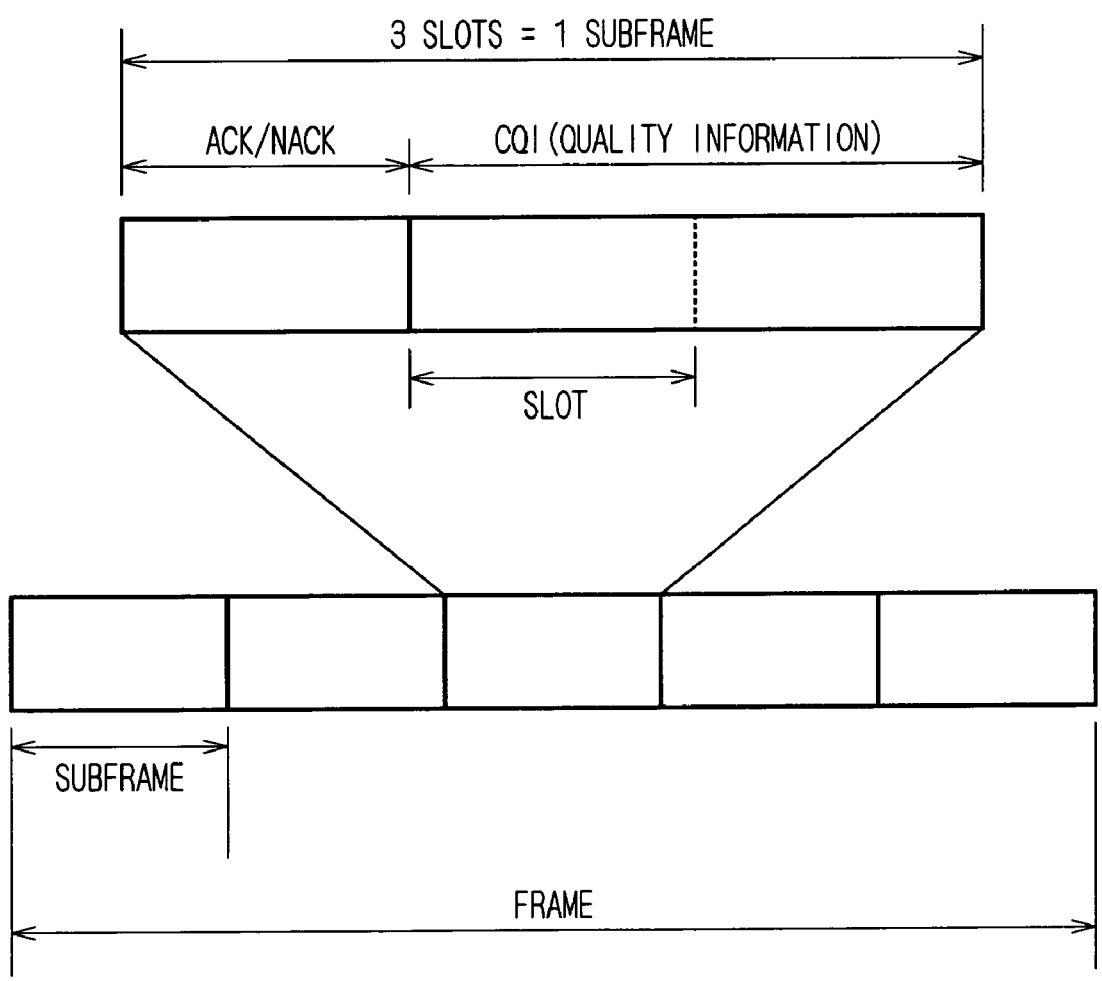
FIG. 4 An explanatory diagram of a frame according to the embodiment 1.

FIG. 4 shows a frame structure in a case of performing data transmission by utilizing the HS-DPCCH 104. One frame is constituted of 15 slots, and three slots utilized in single transmission are referred to subframes. In other words, five subframes are arranged in one frame. Among the three slots constituting one subframe, one slot is for ACK/NACK transmission, and two slots are utilized for the aforementioned quality information CQI transmission. These two are individually utilized, and not necessarily transmitted at the same time.

Flows of uplink packet transmission are now described. In the case of downlink packet communication, the base station 200 side performs scheduling in principle, and the terminal 300 transmits a packet to the base station 200 according to a packet transmission period and timing specified for the base station 200. On the other hand, a plurality of scheduling methods are conceivable in the case of uplink packet communication, while the base station performs no scheduling but the transmission decision part 320 in the terminal 300 decides transmission timing of each uplink signal.

Operations of the terminal 300 in downlink communication preference are described.

Figure 5:
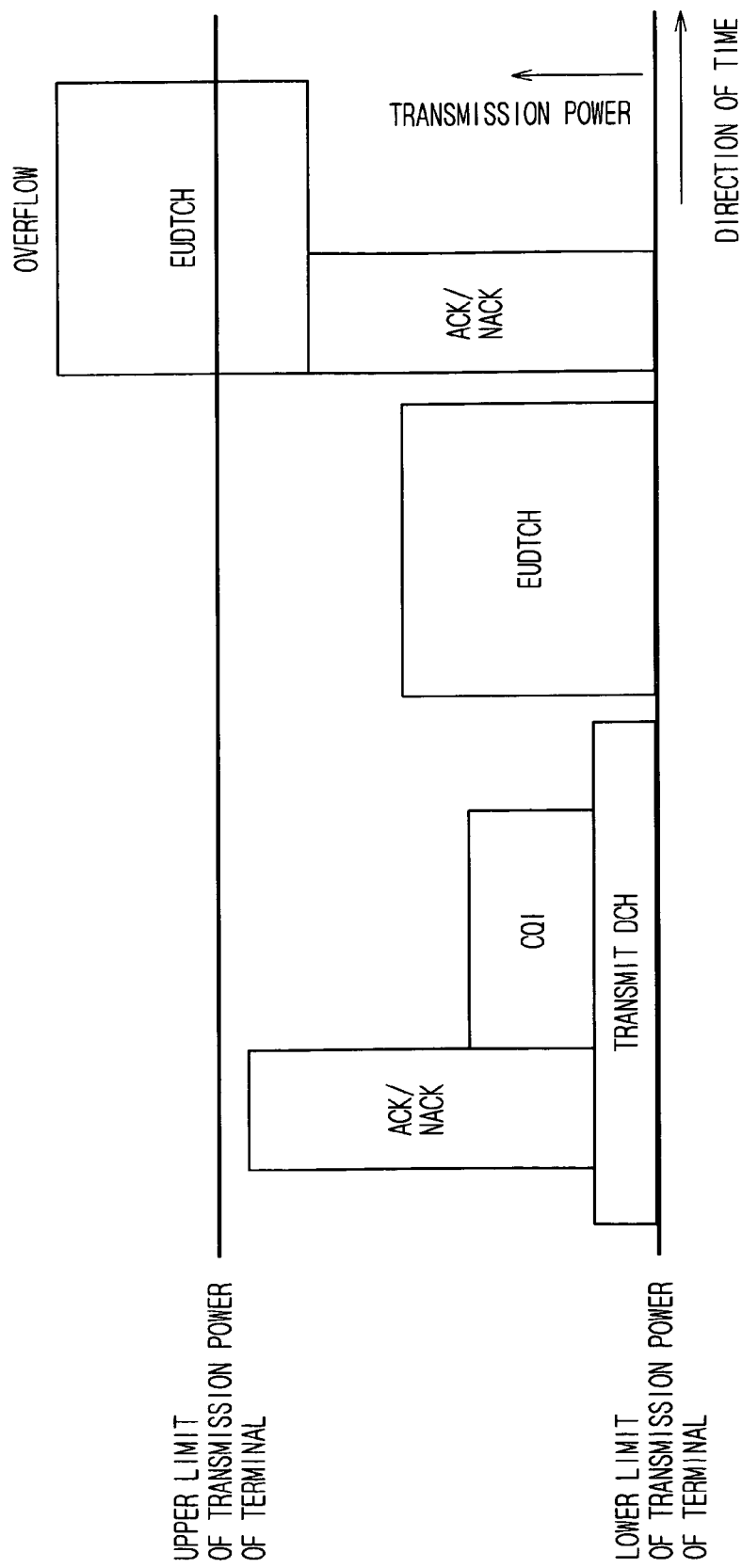
FIG. 5 An explanatory diagram showing an overflow state.

When giving priority to downlink communication, an output of the power amplification part 305 is limited not to exceed a specified value even if the range of the TFCI selectable in the TFRI transmission processing part 323 overlaps with transmission timing of the HS-DPCCH transmission control part 317. If this output exceeds the specified value as shown in FIG. 5, power necessary for transmission exceeds the upper limit of transmission power of the terminal 300 when the transmission timing for the uplink packet data by the ACK/NACK and the EUDTCH overlaps, and an overflow state takes place. When the overflow state takes place, an error rate of an information signal related to uplink packet data and downlink packet data increases, and hence necessity for retransmitting the uplink packet data and the downlink packet data takes place to cause a delay or deteriorate communication quality.

Operations of the terminal 300 at a time when uplink packet data is generated in downlink communication preference are described. First, the uplink packet data is stored in the uplink packet communication transmission data buffer 324 by an entry from the user. The quantity of the data stored in this uplink packet communication transmission data buffer 324 has been confirmed by the transmission power control part 325.

When the uplink packet data is stored in the uplink packet communication data buffer 324, the uplink packet communication data buffer 324 posts the presence of the uplink packet data to the transmission decision part 320. The transmission decision part 320 receiving this post transmits a transmission permission request signal requiring a doing of permitting transmission of the uplink packet data to the base station to the base station 200 through an SICCH transmission processing part 326. On the basis of a subframe position posted by the base station 200 by utilizing the DL-SACCH with respect to this transmission, the timing control part 318 instructs the TFRI transmission processing part 323 to transmit the TFCI.

The TFRI transmission processing part 323 receiving this instruction selects a TFCI capable of transmitting the uplink packet data with low transmission power, so that output power of the signal output from the HS-DPCCH transmission processing part 317 can be ensured.

The EUDTCH transmission processing part 322 receiving this output of the TFRI transmission processing part 323 transmits the packet stored in the uplink packet communication transmission data buffer 324 on the basis of the TFCI selected in the transmission power control part 325 within a limit. On the other hand, operations of the terminal 300 in a case of receiving downlink packet data in downlink communication preference are described.

When receiving the downlink packet data, it receives control information related to the downlink packet data by utilizing the HS-SCCH in advance. On the basis of this receiving, the transmission power control part 325 limits the TFRI transmission processing part 323 so that only a TFCI with which transmission power under transmission does not exceed the specified value also when simultaneously transmitting the uplink packet data by the EUDTCH and the ACK/NACK or the CQI by the HSDPCCH can be selected as the TFCI employed for encoding the uplink packet data.

Due to this limitation, the transmission power under transmission does not exceed the specified value whenever the ACK/NACK is transmitted, until the limitation is thereafter canceled.

Figure 7:
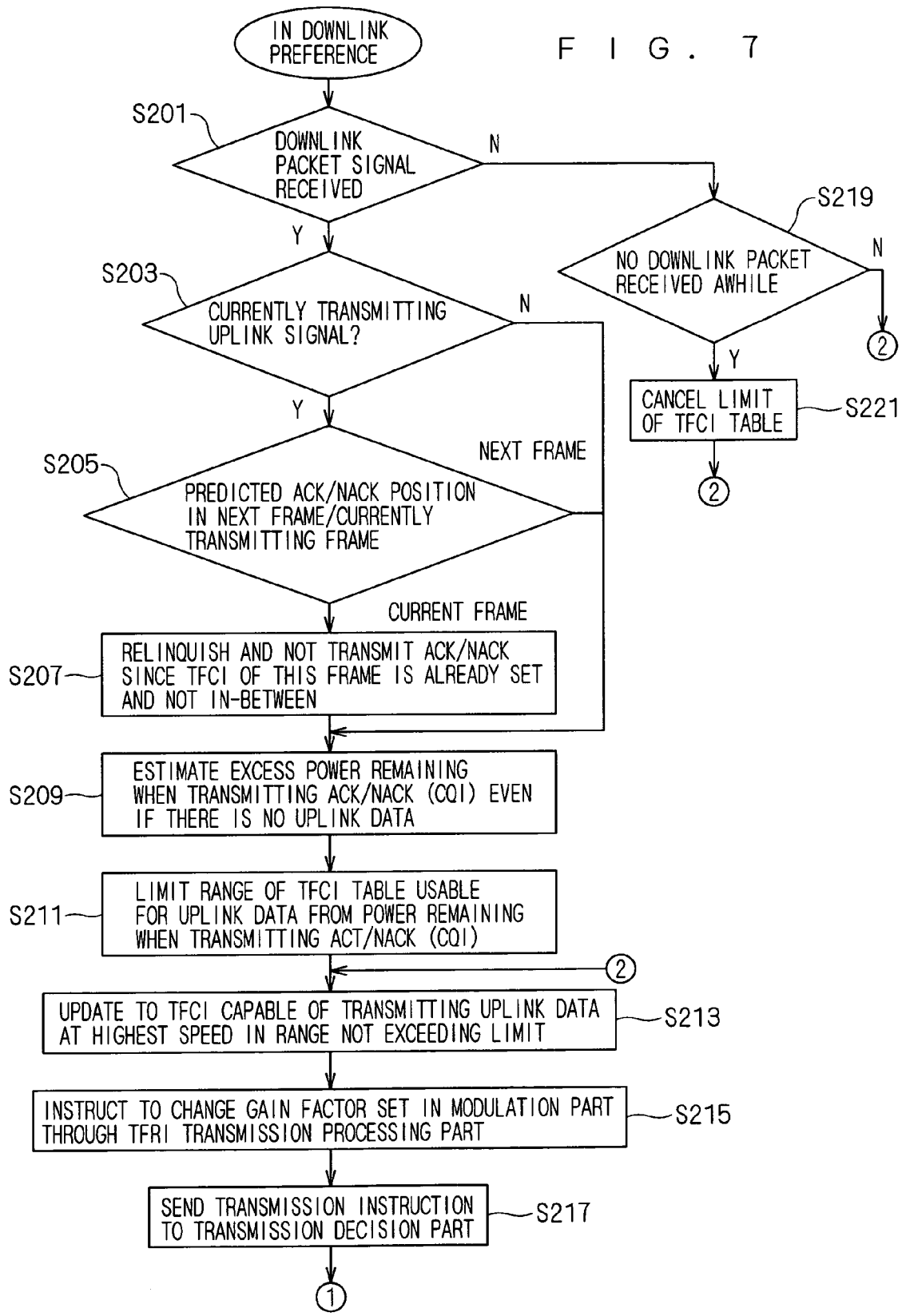
FIG. 7 An operation explanatory diagram of the principal parts of the terminal according to the embodiment 1.
Figure 8:
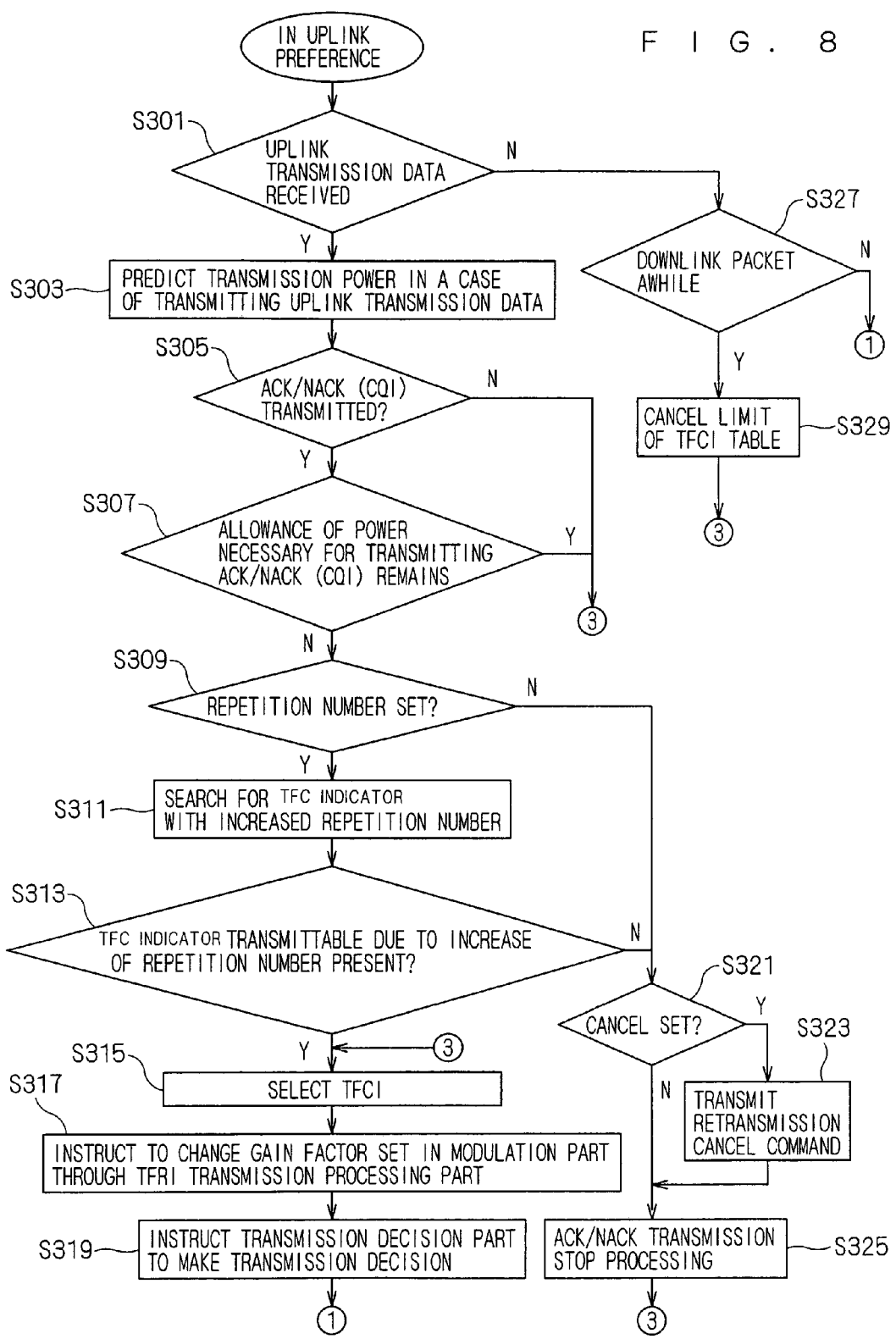
FIG. 8 An operation explanatory diagram of the principal parts of the terminal according to the embodiment 1.

Operations of the transmission power control part 325 limiting the TFRI transmission processing part 323 are now described on the basis of FIG. 6 to FIG. 8.

When the operation of the terminal 300 starts, an initial TFCI table and priority information indicating the purport that priority is given to uplink communication or downlink communication are set in a transmission power control part 325 (storage means) provided in the terminal 300 (S102). When initialization ends, the transmission power control part 325 confirms that priority is internally given to uplink communication or downlink communication (S104). It advances to a step S200 when the confirmation result indicates that priority is given to downlink communication, and advances to a step S300 when the same indicates that priority is given to uplink communication. Whether priority is given to uplink communication or downlink communication is desirably properly changed. For example, it changes preferential communication in response to an input signal from the user. When priority is given in response to the input from the user, it is possible to implement optimum communication in response to communication service the user hopes to receive. The terminal may comprise voice signal is input, for switching the priority information indicating that priority is given to uplink communication or downlink communication set in the transmission power control part 325 in response to the result of detection of this voice signal detection means. When doing so, it is possible to provide a terminal and a communication system giving priority to uplink communication when the user is in conversation while giving priority to downlink communication when the user is not in conversation.

Operations of the transmission power control part 325 in a case of giving priority to downlink communication are described.

First, it performs an overflow estimation operation (S201 to S203) of estimating a simultaneous transmission of transmission timing for the uplink packet data and the information signal (ACK/NACK, CQI) related to the downlink packet data (overflow estimation means).

It waits for the control information related to the downlink packet data transmitted from the base station 200 by utilizing the HS-SCCH (S201). This control information can be received in advance of receiving of the downlink packet data, and hence it is possible to detect a transmission prospect for the ACK/NACK and the CQI by receiving the aforementioned control information.

When receiving the control information by the HS-SCCH related to the downlink packet data, it determines whether or not the terminal 300 transmits the uplink packet data (S203). It makes this determination on the basis of an uplink packet quantity detected by the transmission power control part 325 from the uplink packet communication transmission data buffer 324. The uplink packet data is stored in the uplink packet communication transmission data buffer 324 when performing uplink communication. It estimates occurrence of an overflow by detecting that the uplink packet data is present while receiving the downlink packet data through the aforementioned operations (S201 to S203). The overflow estimation means shown here is merely an example, and operations detecting a state where there is a high possibility that transmission timing for the uplink packet data and transmission timing for the information signal (ACK/NACK, CQI) related to the downlink packet data overlap with other constitute the overflow estimation means.

When the determination result at the step S203 indicates a doing of transmitting the uplink packet data (estimates occurrence of an overflow), it determines whether the transmission timing for the ACK/NACK predicted on the basis of the received control signal related to the downlink packet data through the HS-SCCH is in a frame transmitting the uplink packet data or a frame next thereto (S205).

When the detection result at the step S205 indicates that the transmission timing for the ACK/NACK is the next frame, it estimates what degree of power can be output (excess power) assuming that it transmits the ACK/NACK on the basis of a transmission margin output from the subframe position/transmission margin receiving part 319 and power necessary for transmitting the ACK/NACK (S209).

On the basis of this estimation result, the transmission power control part 325 limits the selected TFCI to a constant one.

The TFCI is now described on the basis of FIG. 9. The TFCI is combination of the types (EUDTC and DCCH here) of transport channels transmitting the uplink data and the transmission rate of each transport channel, and a TFC indicator responsive to the transmission rate is assigned to each. It is stored in the transmission power control part 325 as a TFCI table collecting a plurality of TFCIs.

FIG. 9 describes a transmission data quantity per unit TTI (Transmission Time Interval) length as the transmission rate of the TFCI. Since necessary transmission power also increases in order to maintain a prescribed error rate while increasing the transmission rate, it increases output power of the power amplification part 305 when the transmission power control part 325 selects a TFCI of a high transmission rate.

On the basis of estimation of excess power through the step S209, the selectable TFCI in the transmission power control part 325 is limited (S211). Due to this limit, the following description is made assuming that selectable TFC indicators in the TFCI table of FIG. 9 are limited to those of #1 to #3.

In the TFCI table limited by the operation at the step S211, the transmission power control part 325 selects the TFC indicator #3 having the largest transmission rate in the limit range so that the uplink data (EUDTCH and DTCH) can be most swiftly transmitted, and updates the TFCI set in the transmission power control part 325 (S213).

After this updating, the transmission power control part 325 sets the changed TFCI in the TFRI transmission processing part 323. This set TFCI is output from the TFRI transmission processing part 323 before the uplink data is transmitted in the next frame.

On the basis of the change of the TFCI through the step S213, it changes a gain factor becoming an element deciding transmission power per channel in the modulation part 301 (S215).

After this change, the transmission power control part 325 advances to ① in FIG. 6.

It is possible to reliably transmit the ACK/NACK in the next frame due to the aforementioned processing.

After the step S215, the transmission power control part 325 instructs the transmission decision part 320 to perform transmission of the uplink packet data. On the basis of this instruction, the SICCH transmission processing part 326 transmits a signal requesting transmission permission by utilizing the SICCH. This request signal is received in the base station 200, and a signal indicating the subframe position and the transmission margin is input in the subframe position/transmission margin receiving part 319 by utilizing the DL-SACCH when transmission is permitted. The uplink packet data is output from the EUDTCH transmission processing part 322 to the subframe position output from the subframe position/transmission margin receiving part 319. The transmission decision part 320 delivers the TFCI to the base station 200 before the transmission timing for the uplink packet data whether or not it receives the transmission request from the uplink packet transmission data buffer 324 after the step S215. Therefore, the updated TFCI has arrived at the base station 200 at the time of transmitting the uplink packet data, and the demodulation part 211 and the decoding part 221 enter states capable of receiving the uplink data on the basis of the changed TFCI.

When transmitting the ACK/NACK in the next frame, therefore, the base station 200 can receive this ACK/NACK with no error also when the uplink packet data has been simultaneously transmitted.

When the determination result at the step S205 indicates that a scheduled ACK/NACK position is in the frame currently under transmission, it is not possible to change setting of the demodulation part 211 and the decoding part 221 of the base station 200 before transmitting the ACK/NACK even if it changes the set TFCI. Therefore, it stops transmitting the ACK/NACK in this case, so that at least the uplink packet data arrives at the base station 200 (S207). Thereafter it performs operations of the steps 209 to 217 similarly to other cases.

When the determination result at the step S203 indicates that it transmits no uplink packet data, on the other hand, it performs the operations up to the aforementioned steps 209 to S217 in preparation for a case where the transmission timing for the ACK/NACK and the transmission timing for the uplink packet data overlap with each other in the next frame.

When having not received the downlink packet data at the step S201, it determines whether it does not thereafter receive the downlink data either or it is likely to receive the downlink packet data (S219). When this determination result indicates that receiving of the downlink packet data is probable, it advances to ② in FIG. 7 and selects the TFCI on the basis of the uplink packet data quantity detected in the transmission power control part 325 (S213). It performs the operations of the steps S215 to 217 after the selection, and returns to the state of ① in FIG. 6.

When the determination result at the step S219 indicates that the downlink packet data does not come awhile, on the other hand, it cancels the limit of the selection range of the TFCI table of the transmission power control part 325, and selects the TFCI on the basis of the detected uplink packet data quantity (S213). It thereafter performs the operations of the steps S215 to S219 and makes a transition to the state of ① in FIG. 6.

The determination at the step S219 can estimate future receiving of the downlink packet data on the basis of a time measured by a timer (not shown) in the terminal 300 and the number of times of receiving the downlink packet data in the measured time, for example. It may also ask the base station 200 to post the schedule for transmitting the downlink packet data.

A case where a purport of giving priority to uplink is shown at the step S102 is described on the basis of FIG. 8.

First, the transmission power control part 325 performs overflow estimation processing of estimating that the uplink packet data and the information signal (ACK/NACK, CQI) related to the downlink packet data are simultaneously transmitted (S301 to S305).

When priority is given to uplink, the transmission power control part 325 waits for transmitted uplink packet data (S301).

When receiving the uplink packet data during this waiting, it predicts scheduled transmission power presumably output by the power amplification part 205 in a case of transmitting the uplink packet data (S303).

When making this prediction, the transmission power control part 325 determines whether or not there is a transmission schedule for the ACK/NACK or the CQI (S305).

When this determination result indicates a purport that there is no transmission schedule for the ACK/NACK or the CQI (when it does not estimate occurrence of an overflow), there is no need to take any overflow into consideration, and hence it selects the TFCI responsive to the data quantity of the uplink packet data by utilizing the EUDTCH (S315). If the determination result at the step S305 indicates that there is a transmission schedule for the ACK/NACK or the CQI (when it estimates occurrence of an overflow), on the other hand, when transmission is performed based on the TFCI being set at present, it determines whether or not allowance of power necessary for transmitting the ACK/NACK or the CQI remains (S307).

When this determination result indicates that there is no allowance for power, it instructs the HS-DPCH transmission processing part 317 to stop transmitting the ACK/NACK, and does not transmit the ACK/NACK (S325) (transmission signal control means).

After the step S325, it advances to the step S315, at which a TFCI responsive to the data quantity of the uplink packet data is selected (S315).

When the TFCI is selected at the step S315, it sets the selected TFCI in the TFRI transmission processing part 323. Due to this setting, the TFRI transmission processing part 323 changes the gain factor set in the modulation part 301 (S317).

This change is posted to the transmission decision part 320, so that the transmission decision part 320 transmits a transmission permission signal by the SICCH to the base station 200 (S319).

When this transmission is performed, the transmission power control part 325 makes a transition to the state of ① in FIG. 6.

When making communication with a base station retransmitting the same downlink packet data in a case where the ACK/NACK could not be received after a lapse of a prescribed time from transmission of the downlink packet data, the downlink packet data is retransmitted from the aforementioned base station and a communication network is wasted if stopping transmitting the ACK/NACK in the terminal 300. Therefore, setting of transmitting a cancel command (retransmission stop signal) for stopping retransmitting the downlink packet data from the terminal 300 may also be provided.

When this setting is present, it advances to the step S325 after the step S321 (S323), and hence it transmits the cancel command at this step. While it may also newly add signaling for transmitting the cancel command, no signaling may be newly prepared since the cancel command is also posted to the base station by transmission of the TFCI when previously expanding the TFCI table and writing the cancel command in this TFCI table. And, it can transmit the cancel command (retransmission stop signal) before transmission of the uplink packet data.

When setting a mode of switching the Repetition number of the ACK/NACK to a high speed, it makes a transition to a mode of increasing the Repetition number if the determination result at the step S307 is that power necessary for transmitting the ACK/NACK is insufficient (S309).

The Repetition number indicates the number of times of repetitively transmitting the same signal, and when the terminal 300 previously posts the Repetition number to the base station 200, it is possible to implementing an error rate similar to a case of making transmission once with sufficient transmission power if receiving the same signal by the Repetition number even if power for making single transmission from the terminal 300 is weak. Therefore, the terminal 300 can control the transmission power of a channel increasing the Repetition number. The Repetition number must be posted at a high speed since it is necessary to deliver the same to the base station before transmitting the signal (ACK/NACK or CQI) employing this channel to the base station. In this point, the TFCI signal in the W-CDMA system can be delivered from the terminal to the base station at a high speed. When transmitting a TFCI signal previously building information indicating the Repetition number in a space area of an extended TFCI format, therefore, the Repetition number can be swiftly posted without preparing new signaling.

After the step S309, the transmission power control part 325 retrieves TFCIs capable of most swiftly transmitting the uplink packet data and capable of controlling the transmission power necessary for single transmission of the ACK/NACK or the CQI by increasing the Repetition number as to the HS-DPCCH (S311).

If a desired TFCI is present among the retrieved TFCIs, it selects this TFCI (S313, S315). When newly selecting a TFC indicator, the transmission power control part 325 changes the TFC set in the TFRI transmission processing part 323 (transmission signal control means). Due to this change, the modulation part 301 detects the changed TFCI when the TFCI signal is transmitted next, and changes the gain factor set in the modulation part 301 to the gain factor responsive to the TFCI after transmission of the TFCI signal (S317).

Following the step S317, the transmission power control part 325 posts a transmission permission request signal by the SICCH to the base station 200, transmits the TFCI signal after this post, and performs transmission of the uplink packet data by the EUDTCH by receiving a response to the aforementioned post from the base station 101 (S319).

Following the step 319, the transmission power control part 325 advances to the state of ① in FIG. 6.

If there is no one capable of transmitting the uplink packet data and the ACK/NACK or the CQI by the HS-DPCCH among the transmittable TFCIs also when increasing the Repetition number (S313), it stops transmitting the ACK/NACK or the CQI (S325), and selects a TFCI responsive to the transmission quantity of the uplink packet data (S315). It thereafter performs the operations of the steps S317 to S319.

Since no Repetition numbers are built in TFCIs set in the current W-CDMA system, it is necessary to use an extended TFCI format in order to use this method. The TFCIs are coded to a signal train in the terminal, and the base station decodes the coded signal train to the TFRI table. In order to apply a system extending the TFCIs, therefore, a part coding the TFCIs in the terminal and a part decoding the same in the base station may sufficiently be improved.

The TFCI table of the extended format is described on the basis of FIG. 9.

According to the new format, information controlling transmission power for the information signal related to downlink packet communication such as the Repetition numbers related to the ACK/NACK and the CQI is shown in addition to the TFC indicators, EUDTCH data and DCCH control information.

It is possible to change the properties of the terminal depending on the manner of setting the Repetition numbers. Set examples of the Repetition numbers are described on the basis of FIG. 10.

(CASE.B)

In a TFCI table shown in CASE.B, the Repetition number as to the ACK/NACK or the CQI increases about the TFC indicator increasing power necessary for transmission by the EUDTCH. In other words, it controls transmission power for the ACK/NACK or the CQI. Since it is possible to lower the transmission power for the ACK/NACK or the like when rendering the uplink packet data high-speed on the basis of this TFCI table, it is possible to implement a terminal maintaining downlink communication quality to the utmost while giving priority to uplink communication under such a situation that the transmission power for the ACK/NACK or the like is rendered insufficient when transmitting uplink data at a high speed.

(CASE.C)

In a TFCI table shown in CASE.C, the Repetition number for the ACK/NACK increases about the TFC indicator increasing power necessary for transmission by the EUDTCH. It makes setting of not transmitting the ACK/NACK or the like when the level of the transmission power particularly increases (TFRI numbers are #3 and #4 in FIG. 10).

It is possible to implement a terminal effective in a case where transmission power tends to be insufficient when performing transmission of the uplink packet data through the EUDTCH at a high speed by stopping transmission of the ACK/NACK or the like itself.

(CASE.D)

A TFCI table shown in CASE.D is assumed not to transmit the ACK/NACK or the like when utilizing a DCCH, and assumed to render the Repetition number of the ACK/NACK and the CQI once or twice and transmit the same only when not utilizing the DCCH. The DCCH is a channel transmitting control information. It is possible to implement a terminal not much sacrificing downlink communication while giving priority to transmission of uplink data to the utmost by setting this TFCI table.

In a case of changing the Repetition number, it employs a table shown in FIG. 10 (CASE.A) in place of FIG. 9 as to the TFCI table used in initialization. This is because a TFCI table such as CASE.A in which the Repetition number is regularly 1 plays a role similar to that of the table shown in FIG. 9 not changing the Repetition number and has the same format as the TFCI format in the case of increasing the Repetition number and hence it is not necessary to change the format of the TFCI along with change of the Repetition number.

According to this terminal related to the embodiment 1, as hereinabove described, it is possible to avoid an overflow caused by overlapping of the transmission timing for the uplink data and the information signal related to the downlink packet data as well as to perform operations giving priority to uplink communication and operations giving priority to downlink communication, whereby it is possible to provide a terminal and a communication system speeding up uplink communication or downlink communication.

Since it is possible to implement a communication system giving priority to uplink communication or downlink communication by improving a terminal, a communication system giving priority to uplink communication or downlink communication is easy to implement.

Further, the terminal can switch whether or not to perform control of the aforementioned information signal or the uplink data or transmission stop every time it transmits the information signal related to the downlink packet data or the uplink data, whereby communication quality of a nonpreferential communication direction may not be unnecessarily sacrificed. Therefore, it is effective particularly in a case where an overflow abruptly takes place.

When the terminal estimates an overflow, it controls the transmission power for the information signal while posting that it repetitively transmits the information signal a prescribed number of times and repetitively transmits the aforementioned information signal after this post, whereby an overflow can be avoided also in a case of simultaneously transmitting the information signal and the uplink data while it is also possible to maintain an error rate of the information signal.

Further, it transmits the TFCI signal in which information indicating repetitive transmission is built in the space area, whereby it is possible to provide a terminal and a communication system capable of repetitively posting transmission of a signal at high speed from the terminal to a base station.

Further, it comprises retransmission stop signal transmission means transmitting a retransmission stop signal making the aforementioned base station stop packet retransmission before transmission or after transmission of the uplink data on the basis of the estimation result of the aforementioned overflow estimation means, whereby it is possible to provide a terminal and a communication system preventing occurrence of packet retransmission when preventing an overflow.

Further, it comprises selection means (S104) selectively operating uplink communication priority means (S300) or downlink communication priority means (S200) according to priority information stored in storage means (transmission power control part 325) when the overflow estimation means estimates an overflow, whereby it is possible to provide a terminal and a communication system making communication giving priority to uplink communication or downlink communication while avoiding occurrence of an overflow.

Further, the aforementioned priority information stored in the storage means (transmission power control part 325) is constituted to be changeable with an input signal by an operation of the user, whereby it is possible to provide a terminal and a communication system giving priority to a communication direction in which the user wishes to be provided.

Further, it changes priority information stored in a storage unit (transmission power control part 325) in response to a detection result of voice signal detection means detecting whether or not a voice entry is made, whereby it is possible to automatically set the priority information stored in the storage unit to automatically give priority to the uplink communication when the user starts conversation and to give priority to downlink communication while the user stops the conversation.

The overflow estimation means of the embodiment 1 has estimated an overflow by detecting that uplink packet data is transmitted in a period of transmitting the downlink packet or has estimated an overflow depending on whether or not the information signal (ACK/NACK, CQI) related to the downlink packet data is transmitted in a period of transmitting the uplink packet data. However, the overflow estimation means is not restricted to such means, but occurrence of an overflow caused by simultaneously transmitting uplink packet data and an ACK/NACK or a CQI may be estimated by detecting a fact that an overflow takes place continuously for a prescribed time, for example.

If an overflow takes place continuously for a prescribed time, the overflow may be caused by continuously transmitting uplink packet data at a high transmission rate also when neither ACK/NACK nor CQI is transmitted. In this case, transmission power of a terminal is unchangeably close to a specific value even if the terminal lowers the transmission rate and an overflow is easily caused by the ACK/NACK or the CQI, and hence it is possible to provide a terminal and a communication system giving priority to downlink or uplink communication even if controlling transmission of uplink packet data or the ACK/NACK or the CQI or outputting an instruction signal instructing a base station to control the quantity of transmission of downlink packet data, in this state.

Although it has been a communication system in which uplink packet data is transmitted by utilizing the EUDTCH in the embodiment 1, uplink data is not restricted to packet data, as a matter of course.

Whether a channel transmitting uplink data is the EUDTCH set according to a communication standard referred to as Uplink Enhancement or a DTCH set according to a communication standard referred to as R99 does not particularly influence the scope of the present invention.

Embodiment 3

A terminal of an embodiment 3 is characterized in transmitting a TFCI signal in selection indicating a doing of not transmitting an information signal (ACK/NACK, CQI) related to downlink packet data thereby posting that it gives priority to uplink communication to a base station, dissimilarly to the terminal of the embodiment 1.

In order to make the above post, the terminal transmits a TFCI including information indicating whether or not to use a channel employed for transmission of the information signal related to the downlink packet data to the base station, as a TFCI table shown in FIG. 11.

If the base station can receive from the terminal that it employs no HS-DPCCH, the base station can recognize that there is no transmission of an ACK/NACK or a CQI in response to the received contents. By recognizing that there is no transmission of the ACK/NACK or the CQI, retransmission of downlink packet data is prevented and a delay of downlink packet communication can be prevented also in a base station retransmitting the same downlink packet data again if the same cannot receive the ACK/NACK with respect to the downlink packet data.

The terminal employing the current W-CDMA system necessarily posts the TFCI to the base station.

If posting information indicating whether or not to employ the HS-DPCCH to the base station as the TFCI, therefore, it is possible to prevent a delay of the downlink packet communication based on the W-CDMA system without increasing the number of signaling employed in a communication system of the current W-CDMA system.

In order to transmit the information indicating whether or not to employ the HS-DPCCH as the TFCI, the format of the TFCI employed in the base station and the terminal may be extended to that also indicating presence/absence of transmission of the HS-DPCCH.

Further, the terminal employing the current W-CDMA system posts the contents of the TFCI table to the base station every frame. When posting the information indicating whether or not to employ the HS-DPCCH to the base station as the TFCI as described above, therefore, it is possible to efficiently post the same to the base station also when presence/absence of use of the HS-DPCCH changes in a short period. Nonuse of the HS-DPCCH is equal to a doing of giving priority to uplink communication, whereby it is also possible to post that the terminal gives priority to uplink communication to the base station every frame. Therefore, it is possible to refine operations of the base station in a case of performing operations responsive to uplink preference or downlink preference in the base station.

Embodiment 4

While the terminal according to the embodiment 1 has executed the ACK/NACK transmission stop processing (S325) shown in FIG. 8 thereby stopping transmitting the ACK/NACK or the CQI and giving priority to transmission of the uplink packet data, a terminal according to this embodiment 4 has a feature in a point of selecting a used TFCI from a TFCI table shown in FIG. 12 thereby stopping transmitting an ACK/NACK or a CQI.

Also according to such a terminal, it is possible to provide a terminal making communication giving priority to uplink communication, similarly to the embodiment 1.

In this terminal, selection of the TFCI is performed without performing the operation at the step S325 in FIG. 8. The remaining operations are similar and hence description is omitted.

In selection of the TFCI, the range allowing selection of the terminal is first decided. It is assumed here that TFC indicators #9 to #12 are limited and TFC indicators #0 to #8 are decided as the selectable range, for example.

Subsequently in the selectable range (#0 to #8), TFC indicators (#8, #7, #4 and #2) of the maximum transmission rate usable in a channel (TrCH1) having high priority are selected.

Then, if there are a plurality of selected TFC indicators, TFC indicators (#7 and #8) of the maximum transmission rate usable in a channel (TrCH2) having subsequently high priority are selected.

Then, if there are a plurality of selected TFC indicators, a TFC indicator (#8) of the maximum transmission rate usable in a channel (HS-DPCCH) having subsequently high priority is selected. If the same can be transmitted by utilizing the HS-DPCCH even if being transmitted by utilizing TrC1 and TrC2 as described above, the same is transmitted by utilizing the HS-DPCCH.

If the TFC indicators selectable by the terminal are limited to #0 to #7, on the other hand, at first, #7, #4 and #2 are selected as TFC indicators of the maximum transmission rate usable in the channel (TrCH1) having high priority, as a TFCI selecting operation.

Then, the TFC indicator (#7) of the maximum transmission rate usable in the channel (HS-DPCCH) of subsequently high priority is selected form the selected TFC indicators.

Therefore, TrCH1 and TrCH2 preferentially ensure transmission power, and transmission by utilizing the HS-DPCCH is limited.

As hereinabove described, it is possible to avoid an overflow and give priority to uplink communication similarly to the embodiment 1 also in the terminal controlling transmission power for the aforementioned information signal, by selecting the TFCI transmitting the information signal (ACK/NACK, CQI) related to the downlink packet data at a low transmission rate.

Further, it is possible to avoid an overflow and give priority to uplink communication similarly to the embodiment 1 also in the terminal controlling transmission power for the aforementioned information signal, by selecting the TFCI not transmitting the information signal (ACK/NACK, CQI) related to the downlink packet data.

Also in the terminal of the embodiment 4, it is possible to change whether or not to control the HS-DPCCH making transmission from the terminal every time transmitting uplink data similarly to the embodiment 1, whereby it is possible to make communication without unnecessarily sacrificing transmission by utilizing the HS-DPCCH. Therefore, it is effective particularly when an overflow abruptly takes place.

Embodiment 5

While the terminal according to the embodiment 1 has employed the TFCI table shown in FIG. 9, it is possible to perform operations similar to those of the terminal shown in the embodiment 1 also when employing a TFCI table show in FIG. 13.

The operation of limiting the range of the TFCI table that may be used for the uplink data from power remaining when transmitting the ACK/NACK (CQI) at the step S211 is equal to an operation of selecting TFC indicators capable of transmitting by utilizing the HS-DPCCH which is the channel having the highest priority and selecting a TFC indicator maximizing the transmission rate of the channel having subsequently high priority from the selected TFC indicators.

It is possible to attain effects similar to those of the embodiment 1 also when selecting the TFCI in the aforementioned manner.

What is claimed is:

1. A communication terminal comprising:
   overflow estimation means estimating a simultaneous transmission, to a base station, of uplink data and an information signal related to downlink packet data received from said base station; and
   transmission signal control means controlling transmission of said information signal in response to the result of estimation of said overflow estimation means.

2. The communication terminal according to claim 1, wherein said transmission signal control means stops transmitting said information signal.

3. The communication terminal according to claim 2, wherein transmitting said information signal is stopped by selecting a TFCI not transmitting said information signal.

4. The terminal according to claim 3, wherein preference of uplink communication is posted to the base station by transmitting a TFCI signal under selection indicating non-transmission of said information signal.

5. The communication terminal according to claim 1, wherein said transmission signal control means controls transmission power for said information signal.

6. The communication terminal according to claim 5, wherein transmission power for said uplink data is controlled by selecting a TFCI transmitting said information signal at a low transmission rate.

7. The communication terminal according to claim 5, comprising posting means posting to the base station a repetitive transmission of said information signal a prescribed number of times,
   wherein said information signal is transmitted repetitively after said post of the posting means.

8. The communication terminal according to claim 7, wherein said posting means transmits a TFCI signal having a space area in which information indicating repetitive transmission is built.

9. The communication terminal according to claim 1, comprising retransmission stop signal transmission means transmitting a retransmission stop signal making said base station stop retransmitting the downlink packet data before transmission or after transmission of said uplink data on the basis of the result of estimation of said overflow estimation means.

10. The communication terminal according to claim 1, wherein an instruction signal instructing said base station to control transmission of the downlink packet data is transmitted before transmission or after transmission of said uplink data on the basis of the result of estimation of said overflow estimation means.

11. A communication terminal comprising:
   overflow estimation means estimating a simultaneous transmission of uplink data and a communication quality signal to a base station; and
   transmission signal control means controlling transmission of said communication quality signal in response to the result of estimation of said overflow estimation means.

12. The communication terminal according to claim 11, wherein said transmission signal control means stops transmitting said communication quality signal.

13. The communication terminal according to claim 11, wherein said transmission signal control means controls transmission power for said communication quality signal.

14. The communication terminal according to claim 11, comprising posting means posting to the base station a repetitive transmission of said communication quality signal a prescribed number of times,
   wherein said information signal is transmitted repetitively after the post of said posting means.

15. The communication terminal according to claim 11, wherein an instruction signal instructing said base station to control transmission of downlink packet data is transmitted before transmission or after transmission of said uplink data on the basis of the result of estimation of said overflow estimation means.

16. A communication terminal comprising:
   overflow estimation means estimating a simultaneous transmission, to a base station, of uplink data and an information signal related to downlink packet data received from said base station; and
   transmission signal control means controlling transmission of the uplink data in response to the result of estimation of said overflow estimation means.

17. The communication terminal according to claim 16, wherein said transmission signal control means controls transmission power for said uplink data.

18. The communication terminal according to claim 17, wherein transmission power for said uplink data is controlled by selecting a TFCI transmitting said uplink data at a low transmission rate.

19. A communication terminal comprising:
   overflow estimation means estimating a simultaneous transmission, to a base station, of uplink data and an information signal related to downlink packet data received from said base station;
   uplink communication priority means controlling transmission of said information signal;
   downlink communication priority means controlling transmission of said uplink data;
   storage means previously storing priority information indicating preference of uplink communication or downlink communication; and
   selection means selectively operating said uplink communication priority means or the downlink communication priority means according to the priority information stored in said storage means when said overflow estimation means estimates an overflow.

20. The communication terminal according to claim 19, wherein said priority information stored in said storage means is constituted to be changeable with an input signal operated by a user.

21. The communication terminal according to claim 19, comprising voice signal detection means detecting whether or not a voice input is made,
   wherein the priority information stored in said storage unit is changed in response to the result of detection of said voice signal detection means.

22. A communication system comprising a base station and a communication terminal transmitting/receiving data to/from said base station, wherein
   said base station
      has transmission/receiving means transmitting downlink packet data to said communication terminal while receiving an information signal related to said downlink packet data from said communication terminal receiving said downlink packet data, and
   said communication terminal comprises:
      overflow estimation means estimating a simultaneous transmission of uplink data and said information signal to said base station, and
      transmission signal control means controlling transmission of said information signal in response to the result of estimation of said overflow estimation means.

23. A communication system comprising a base station and a communication terminal transmitting/receiving data to/from said base station, wherein
   said base station
      has transmission/receiving means transmitting downlink packet data to said communication terminal while receiving an information signal related to said downlink packet data from said communication terminal receiving said downlink packet data, and
   said communication terminal comprises:
      overflow estimation means estimating a simultaneous transmission of uplink data and said information signal to said base station, and
      transmission signal control means controlling transmission of the uplink data in response to the result of estimation of said overflow estimation means.

24. A communication system comprising a base station and a communication terminal transmitting/receiving data to/from said base station, wherein
   said base station
      has communication system change means changing the communication system of downlink communication to an optimum communication system on the basis of a communication quality signal indicating a communication quality state received from said communication terminal, and
   said communication terminal comprises:
      overflow estimation means estimating a simultaneous transmission of uplink data and said communication quality signal to said base station, and
      transmission signal control means controlling transmission of said communication quality signal in response to the result of estimation of said overflow estimation means.

25. A communication system comprising a base station and a communication terminal transmitting/receiving data to/from said base station, wherein
   said base station
      has communication system change means changing the communication system of downlink communication to an optimum communication system on the basis of a communication quality signal indicating a communication quality state received from said communication terminal, and said communication terminal comprises:

overflow estimation means estimating a simultaneous transmission of uplink data and said communication quality signal to said base station, and transmission signal control means controlling transmission of said uplink data in response to the result of estimation of said overflow estimation means.

26. A communication system comprising a base station and a communication terminal transmitting/receiving data to/from said base station, wherein said base station has transmission/receiving means transmitting downlink packet data to said communication terminal while receiving an information signal related to said downlink packet data from said communication terminal receiving said downlink packet data, and said communication terminal comprises:

overflow estimation means estimating a simultaneous transmission of uplink data and said information signal to said base station, uplink communication priority means controlling transmission of said information signal, downlink communication priority means controlling transmission of said uplink data, storage means previously storing priority information indicating preference of uplink communication or downlink communication, and selection means selectively operating said uplink communication priority means or the downlink communication priority means according to the priority information stored in said storage means when said overflow estimation means estimates an overflow.

* * * * *